(12) United States Patent
Wahl et al.

(10) Patent No.: US 10,302,169 B2
(45) Date of Patent: May 28, 2019

(54) HYDRAULIC VIBRATION DAMPER

(71) Applicant: VOLKSWAGEN AKTIENGESELLSCHAFT, Wolfsburg (DE)

(72) Inventors: Stephan Wahl, Koenigslutter (DE); Marco Schreiner, Braunschweig (DE); Jan-Rickmer Schlegel, Gross Schwuelper (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 15/860,085

(22) Filed: Jan. 2, 2018

(65) Prior Publication Data

US 2018/0119769 A1   May 3, 2018

Related U.S. Application Data

(63) Continuation of application No. PCT/EP2016/063450, filed on Jun. 13, 2016.

(30) Foreign Application Priority Data

Jul. 2, 2015   (DE) .......................... 10 2015 212 404

(51) Int. Cl.
 *F16F 9/06* (2006.01)
 *F16F 9/18* (2006.01)
 (Continued)

(52) U.S. Cl.
 CPC .............. *F16F 9/469* (2013.01); *F16F 9/062* (2013.01); *F16F 9/185* (2013.01); *F16F 9/3214* (2013.01);
 (Continued)

(58) Field of Classification Search
 CPC .... F16F 9/38; F16F 9/062; F16F 9/185; F16F 9/368; F16F 9/3214; F16F 9/3235; F16F 9/49
 (Continued)

(56) References Cited

U.S. PATENT DOCUMENTS 3,036,669 A * 5/1962 Schultze ................... F16F 9/49
                                                      188/282.1
3,086,622 A * 4/1963 Schultze ................... F16F 9/49
                                                      188/300

(Continued)

FOREIGN PATENT DOCUMENTS

DE         894 965       10/1953
DE     34 06 976 A1      9/1985
(Continued)

*Primary Examiner* — Robert A. Siconolfi
*Assistant Examiner* — San M Aung
(74) *Attorney, Agent, or Firm* — Muncy, Geissler, Olds & Lowe, P.C.

(57) ABSTRACT

A hydraulic vibration damper having an inner tube arranged in a container; a piston arranged such that it is axially movable in the inner tube and the internal space of which is divided into a first working chamber and a second working chamber; a sealing element via which the piston rests against the inner tube in order to seal the first and second working chambers against one joining the first and second working chambers and arranged on the piston; and a bottom valve arranged on an axial end section of the inner tube in order to join the second working chamber to a compensation space formed between the container and the inner tube. The bottom valve projects axially into the second working chamber with a section. The piston has an operating position, in which same radially surrounds the section of the bottom valve projecting into the second working chamber.

5 Claims, 2 Drawing Sheets

(51) Int. Cl.
*F16F 9/32* (2006.01)
*F16F 9/36* (2006.01)
*F16F 9/38* (2006.01)
*F16F 9/46* (2006.01)

(52) U.S. Cl.
CPC ............ *F16F 9/3235* (2013.01); *F16F 9/368* (2013.01); *F16F 9/38* (2013.01)

(58) Field of Classification Search
USPC ......... 188/315, 318, 269, 266.5, 266.3, 266, 188/314
See application file for complete search history.

(56) References Cited

U.S. PATENT DOCUMENTS

| | | |
|---|---|---|
| 4,303,231 A | 12/1981 | Reuschenbach et al. |
| 4,821,850 A | 4/1989 | Geiling et al. |
| 5,078,240 A | 1/1992 | Ackermann et al. |
| 5,234,084 A * | 8/1993 | Bell ...................... F16F 9/3214 188/276 |
| 5,518,090 A | 5/1996 | Miller et al. |
| 5,785,160 A | 7/1998 | Grundei |
| 5,878,850 A * | 3/1999 | Jensen ................... F16F 9/464 188/267 |
| 6,371,262 B1 | 4/2002 | Katou et al. |
| 2002/0056368 A1 | 5/2002 | May |
| 2004/0262107 A1* | 12/2004 | Nandyal ................ F16F 9/092 188/314 |

FOREIGN PATENT DOCUMENTS

| | | |
|---|---|---|
| DE | 36 11 288 A1 | 10/1987 |
| DE | 40 16 807 A1 | 1/1991 |
| DE | 195 23 397 C1 | 8/1996 |
| DE | 198 47 343 A1 | 4/2000 |
| DE | 100 20 778 A1 | 1/2001 |
| EP | 0 322 608 A2 | 7/1989 |
| FR | 1 136 853 A | 5/1957 |
| FR | 256 0324 A1 | 8/1985 |

* cited by examiner

HYDRAULIC VIBRATION DAMPER

This nonprovisional application is a continuation of International Application No. PCT/EP2016/063450, which was filed on Jun. 13, 2016 and which claims priority to German Patent Application No. 10 2015 212 404.5, which was filed in Germany on Jul. 2, 2015, and which are both herein incorporated by reference.

BACKGROUND OF THE INVENTION

Field of the Invention

The invention relates to a hydraulic vibration damper, comprising a container, an inner tube which is arranged in the container, a piston which is arranged in the inner tube such that it is axially movable, and the internal space of which is divided into a first working chamber and a second working chamber, a sealing element, via which the piston rests against the inner tube, in order to mutually seal the first and second working chamber, an electrically controllable valve for connecting said first and second working chamber, which is arranged on the piston, and a bottom valve, which is arranged at an axial end portion of the inner tube in order to connect the second working chamber with a compensation space formed between the container and the inner tube.

Description of the Background Art

Hydraulic vibration dampers are used, for example, in wheel suspensions of motor vehicles in order to support axle components with respect to the vehicle body, and to dampen their movement.

Using switching and control systems including, among other things, an electrically controllable valve on the piston of the vibration damper, the damping behavior of such a vibration damper can be influenced in the compression and extension stages in that by means of the electrically controllable valve, the overflow performance of a damper medium located in the inner tube is altered between the working chambers.

A hydraulic vibration damper of the type mentioned above is known, for example, from DE 100 20 778 A1, which corresponds to U.S. Pat. No. 6,371,262.

Compared to passive valves, electrically controllable valves require significantly more space on the piston in the axial and radial direction. This results in a smaller piston stroke despite equal external dimensions. This may be compensated by a larger overall length of the damper and a larger diameter of the damper. However, this is unfavorable in view of the limited space in the a wheel suspension area of a motor vehicle. In addition, the weight of the component also increases because of the larger amount of oil needed.

SUMMARY OF THE INVENTION

It is therefore an object of the present invention to provide a particularly compact, semi-active hydraulic vibration damper.

In an exemplary embodiment, a portion of the bottom valve of the damper projects axially into the second working chamber and the piston has an operating position in which the latter radially surrounds the portion of the bottom valve that projects into the second working chamber, wherein the sealing element is at the height of the bottom valve in this operating position.

By such an arrangement of the sealing element, a maximum piston stroke is made possible, which allows the dimensions of a semi-active vibration damper to be kept small, and thus its weight low.

In addition, this increases the supporting base of the damper, i.e., the minimum distance I between the sealing element on the piston and the guide bushing of the piston rod guide. The component strength is thereby increased in particular with regard to transmitting braking and lateral forces between the piston valve and the inner tube.

Furthermore, more radial space is available on the piston for the electrically controllable valve.

For example, the piston may have an annular section, which in the suggested operating position projects into or is received in a section of the second chamber, which radially surrounds the bottom valve, wherein the sealing element comprises at least one sealing ring, which is arranged on the outer circumference of the annular section.

In an embodiment of the invention, the piston has a cover on its end face pointing to the bottom valve, wherein the sealing element is arranged on the cover. A good adaptation to the contour of the bottom valve, and thus a good utilization of space, can hereby be achieved in a simple manner.

In addition, the piston may comprise a valve housing which accommodates the electrically controllable valve, wherein the cover is attached to the valve housing. Since the sealing element is secured to the cover, structures for receiving the sealing element are not required on the valve housing.

This allows for the valve housing to be designed with a small wall thickness, so that radially more space is available for the electrically controllable valve. In addition, its production is simplified.

For this purpose, it is further advantageous when the sealing element and the electrically controllable valve are spaced apart in the axial direction.

To simplify the assembly, the electrically controllable valve may continue to be fixed by means of the cover in the valve housing. For this purpose, the cover can be frontally screwed into the valve housing. However, other types of attachment are also possible.

According to an embodiment of the invention, the piston can have a valve unit with the electrically controllable valve. In this case, the valve unit is attached to a piston rod by means of the cover, which results in a particularly simple assembly process.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
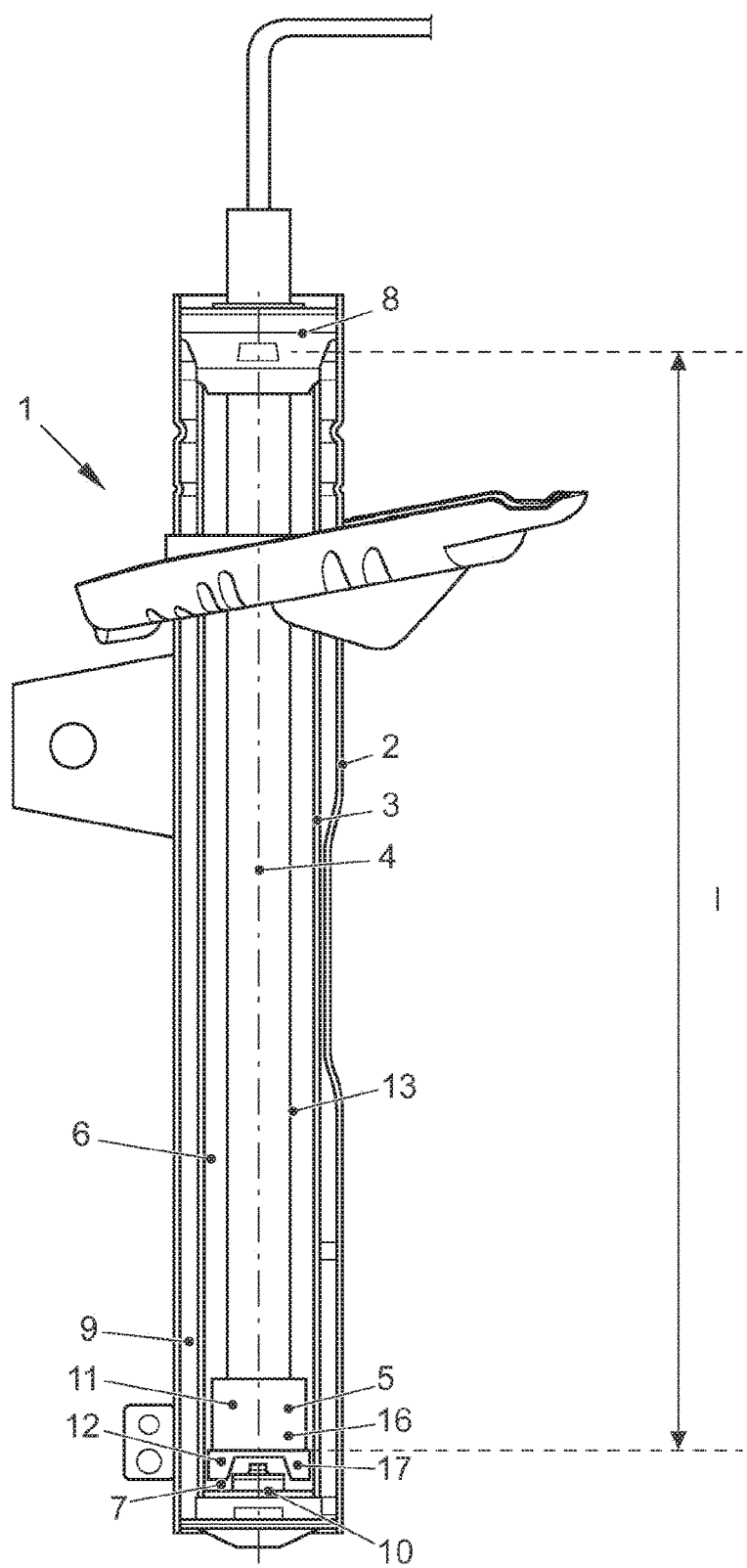
FIG. 1 illustrates a hydraulic vibration damper according to an exemplary embodiment of the invention.

The exemplary embodiment illustrated in the figures shows a hydraulic vibration damper 1, which is formed by way of example as a twin-tube damper for an automobile suspension.

The vibration damper 1 comprises a preferably tubular container 2, into which an inner tube 3 is inserted. The inner tube 3 is cylindrical and closed at its lower end. A piston rod 4 extends into the inner tube 3, with a piston 5 running on the inner wall of the inner tube 3 and sealed against said inner wall.

The piston 5 divides a working chamber within the inner tube 3 into a first working chamber 6 and a second working chamber 7, each filled with a damping medium such as a hydraulic oil. In order to limit the upper, first working chamber 6, the inner tube 3 is closed by a piston rod guide 8, which is supported on an upper front end of the inner tube 3. The piston rod guide 8 has an opening for the piston rod 4. In addition, in the area of the piston rod 4, a sliding seal, also not shown in more detail, is provided on the piston rod guide 8.

The lower, second working chamber 7 is axially closed by a bottom valve 10, which is attached to the lower front end of the inner tube 3, resulting in a particularly slim design.

A compensation space 9, which communicates with the second working chamber 7 via the bottom valve 10, is formed between the inner wall of the container 2 and the outer wall of the inner tube 3. Via the bottom valve 10, most importantly, the volume change caused by the piston rod 4 is compensated for in the interior of the inner tube 3.

Furthermore, the hydraulic vibration damper 1 comprises valves arranged between the working chambers 6 and 7, via whose opening behavior in communication with the bottom valve 10, the characteristic of the hydraulic vibration damper 1 is adjusted in the compression and extension stage. The extension stage is understood to be a state in which the piston rod 4 is moved with the piston 5 in the direction outwardly from the inner tube 3. Here, the pressure in the first working chamber 6 increases, while the pressure in the second working chamber 7 drops. The compression stage, however, is characterized by an insertion of the piston rod 4 into the inner tube 3 with the reverse pressure conditions.

In particular, at least one electrically controllable valve 11 is arranged on the piston 5, which is supplied with current via the piston rod 4. This electrically controllable valve 11 can, for example, be designed as a switching and/or control valve for influencing the flow behavior of the damping medium. It preferably allows for pressure and/or volume flow control and can, for example, be designed as a proportional solenoid valve.

The piston 5 is supported via a sealing element 12 on the inner tube 3, and is guided axially slidable via this sealing element 12 on the inner wall of the inner tube 3.

The sealing element 12, which rests against the inner tube 3, seals off the first and second working chamber 6 and 7 from each other so that no damping medium can flow past the piston 5.

Figure 2:
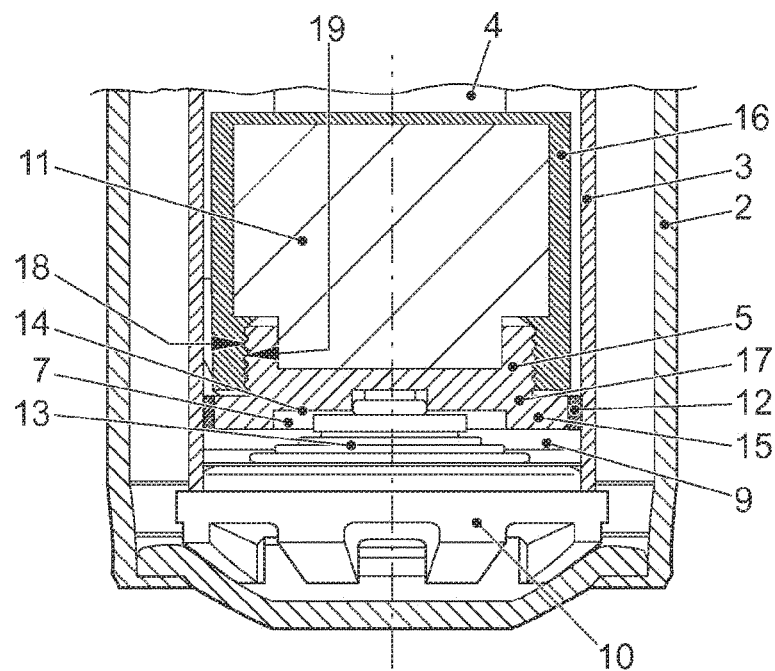
FIG. 2 is a detailed view of the piston of the hydraulic vibration damper according to FIG. 1, with the piston maximally retracted at the end of the compression stage.

As particularly shown in FIG. 2, a portion 13 of the bottom valve 10 projects axially into the second working chamber 7. This portion 13 is surrounded in the radial direction by the damping medium of the second working chamber 7. The end face of the piston 5 pointing to the bottom valve 10 is adapted to the projecting portion 13 in such a way that in an operating position of the piston 5, in this case, with a maximum retracted piston 5 at the end of the compression stage (see. FIG. 2), the piston radially surrounds the portion 13 of the bottom valve 10 that projects into the second working chamber 7. For this purpose, the piston 5 has a corresponding recess 14 in the middle of its front side. In this operating position, the sealing element 12 is at the height of the bottom valve 10.

In particular, the piston 5 has a annular section 15, which, in the operating position illustrated in FIG. 2, at least projects into a portion of the second working chamber 7, which radially surrounds the bottom valve 10. The sealing element 12, which comprises at least one sealing ring, is arranged on the outer circumference of the annular section 15, which surrounds the central recess 14.

In the exemplary embodiment shown in FIG. 2, the piston 5 includes a valve housing 16 for receiving the electrically controllable valve 11 and a cover 17. The cover 17 is arranged on the front end of the piston 5 that points to the bottom valve 10. Via the cover 17, the electrically controllable valve 11 may be fixed in the valve housing 16. In addition, the sealing element 12 sits only on the cover 17. Since the sealing element 12 is axially spaced from the electrically controllable valve 11, the valve housing 17 can be thin-walled and is not radially constrained by the space that is needed for the sealing element 12. On the outside, the valve housing 17 may therefore be designed substantially as a cylindrical body, whose outer diameter is only slightly smaller than the inner diameter of the inner tube 3, so that between them an annular gap remains. In addition, radially more space is available for the sealing element 12 so that it can be better optimized.

The cover 17 may be frontally screwed into the valve housing 17 and for this purpose, has an external threaded portion 18 which engages at the valve housing 16 with an internal threaded portion 19. However, a different manner of fastening can also be provided.

Figure 3:
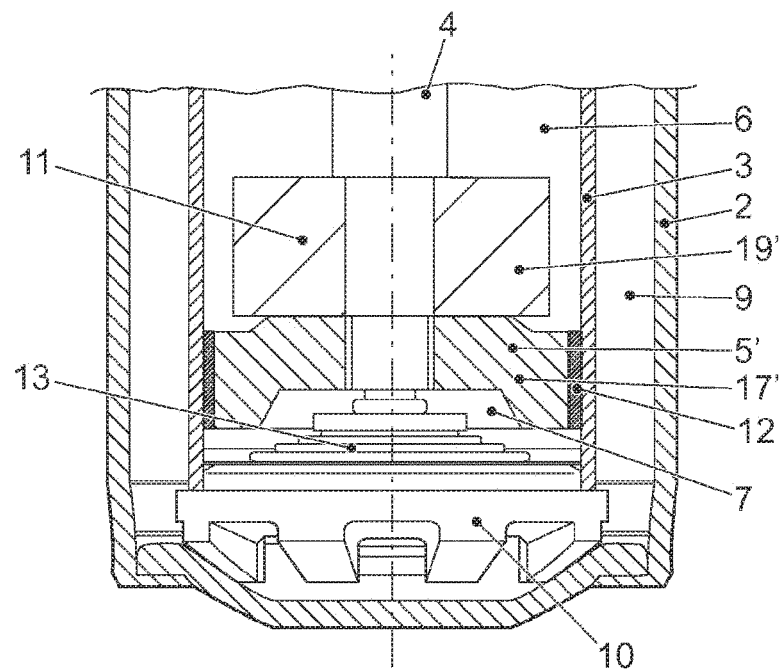
FIG. 3 illustrates a modification of the piston.

The configuration of the piston 5 is not limited to the embodiment shown in FIG. 2. In particular, the cover 17 and the valve housing 1 can also be combined into a single unit. FIG. 3 shows a further modification. Here, the piston 5' has a valve unit 20' with the electrically controllable valve 11. The valve unit 19' is fixed to the piston rod 4 by means of the cover 17'. The piston rod 4 can hereby extend through the valve unit 20'. The cover 17' may be screwed, for example, to the piston rod 4, but may also be fastened to the same in a different manner. The arrangement of the cover 17' together with the sealing element 12 with respect to the bottom valve 10 corresponds to the embodiment shown in FIG. 2.

The above-described arrangement of the sealing element 12, which is located close to the bottom valve and radially overlaps the bottom valve 10 with a maximum retracted piston 5, makes a maximum piston stroke with compact exterior dimensions of the damper 1 possible. This makes it possible to keep the weight of a semi-active vibration damper low. In addition, a long supporting base is provided, which has a positive effect on the component strength. In series production, the inventive solution also makes it possible to use identical bottom valves 10 and inner tubes 3 for passive and semi-active vibration dampers.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A hydraulic vibration damper comprising:
   a container;
   an inner tube arranged in the container;
   a piston disposed axially movable in the inner tube, and an internal space of the inner tube being divided into a first working chamber and a second working chamber;
   a sealing element, via which the piston rests against the inner tube in order to seal off the first working chamber from the second working chamber;
   an electrically controllable valve, for connecting the first working chamber and second working chamber, arranged on the piston; and
   a bottom valve disposed at one axial end portion of the inner tube in order to connect the second working chamber to a compensation space formed between the container and the inner tube,
   wherein a portion of the bottom valve projects axially into the second working chamber,
   wherein the piston has an operating position in which the piston radially surrounds the portion of the bottom valve that projects into the second working chamber,
   wherein in the operating position, the sealing element is at a height of the bottom valve,
   wherein the piston has a cover on an end face that points to the bottom valve, and wherein the sealing element is arranged on the cover,
   wherein the piston comprises a valve housing that receives the electrically controllable valve, and wherein the cover is attached to the valve housing, and
   wherein the electrically controllable valve is fixed via the cover in the valve housing.

2. The hydraulic vibration damper according to claim 1, wherein the cover of the piston comprises an annular section, which in the operating position projects into a portion of the second working chamber and radially surrounds the portion of the bottom valve that projects into the second working chamber, and the sealing element comprises at least one sealing ring, which is arranged on the outer circumference of the annular section of the cover.

3. The hydraulic vibration damper according to claim 1, wherein the sealing element and the electrically controllable valve are arranged spaced apart in the axial direction.

4. A hydraulic vibration damper comprising:
   a container;
   an inner tube arranged in the container;
   a piston disposed axially movable in the inner tube, and an internal space of the inner tube being divided into a first working chamber and a second working chamber;
   a sealing element, via which the piston rests against the inner tube in order to seal off the first working chamber from the second working chamber;
   an electrically controllable valve, for connecting the first working chamber and second working chamber, arranged on the piston; and
   a bottom valve disposed at one axial end portion of the inner tube in order to connect the second working chamber to a compensation space formed between the container and the inner tube,
   wherein a portion of the bottom valve projects axially into the second working chamber,
   wherein the piston has an operating position in which the piston radially surrounds the portion of the bottom valve that projects into the second working chamber,
   wherein in the operating position, the sealing element is at a height of the bottom valve,
   wherein the piston has a cover on an end face that points to the bottom valve, and wherein the sealing element is arranged on the cover,
   wherein the piston comprises a valve housing that receives the electrically controllable valve, and wherein the cover is attached to the valve housing, and
   wherein the cover is frontally screwed into the valve housing.

5. A hydraulic vibration damper comprising:
   a container;
   an inner tube arranged in the container;
   a piston disposed axially movable in the inner tube, and an internal space of the inner tube being divided into a first working chamber and a second working chamber;
   a sealing element, via which the piston rests against the inner tube in order to seal off the first working chamber from the second working chamber;
   an electrically controllable valve, for connecting the first working chamber and second working chamber, arranged on the piston; and
   a bottom valve disposed at one axial end portion of the inner tube in order to connect the second working chamber to a compensation space formed between the container and the inner tube,
   wherein a portion of the bottom valve projects axially into the second working chamber,
   wherein the piston has an operating position in which the piston radially surrounds the portion of the bottom valve that projects into the second working chamber,
   wherein in the operating position, the sealing element is at a height of the bottom valve,
   wherein the piston has a cover on an end face that points to the bottom valve, and wherein the sealing element is arranged on the cover, and
   wherein the piston has a valve unit with the electrically controllable valve and the valve unit is fixed to a piston rod via the cover.

* * * * *